United States Patent Office 3,562,047
Patented Feb. 9, 1971

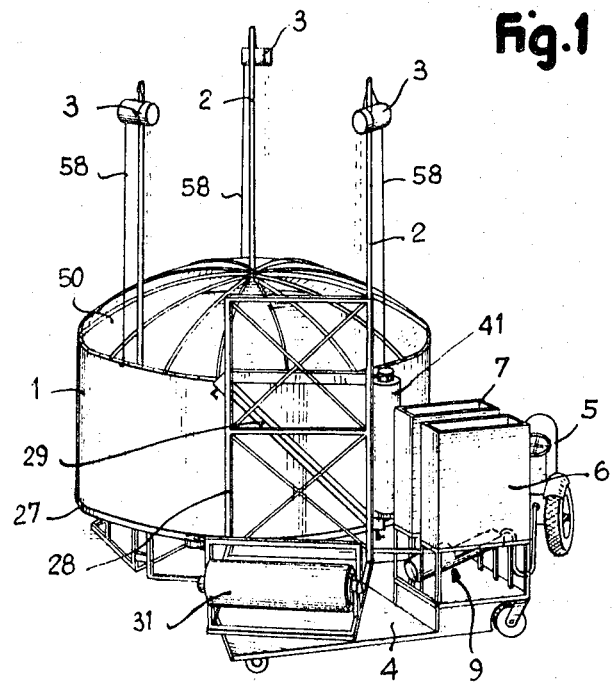

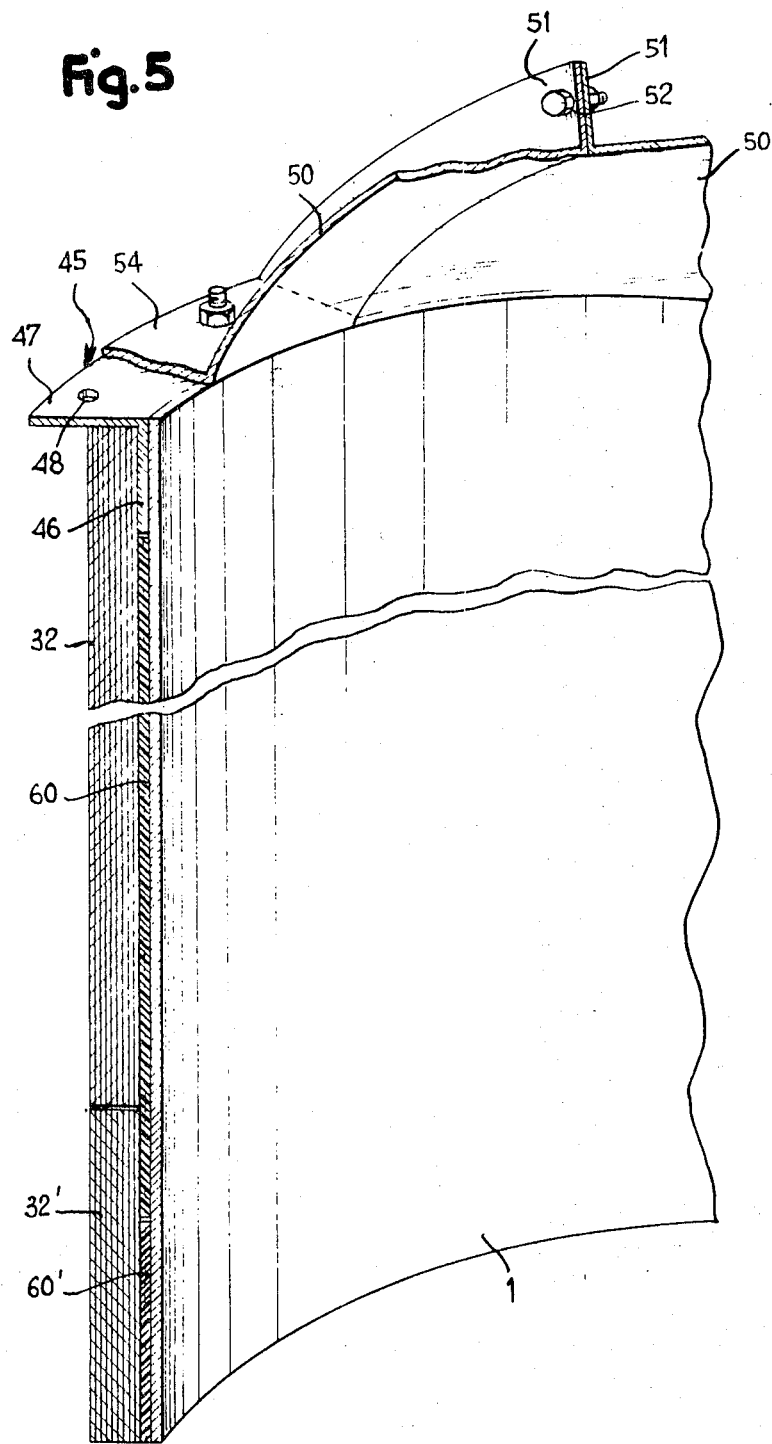

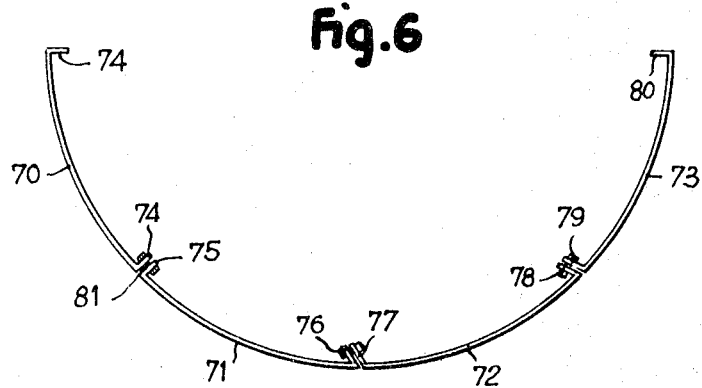
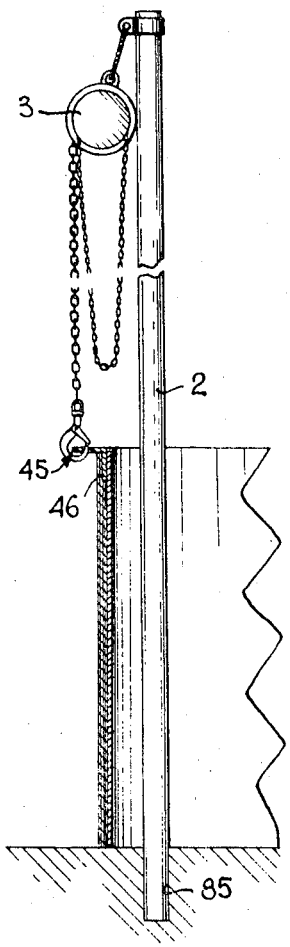
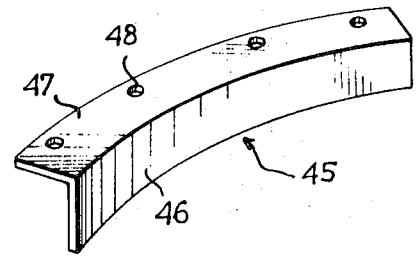
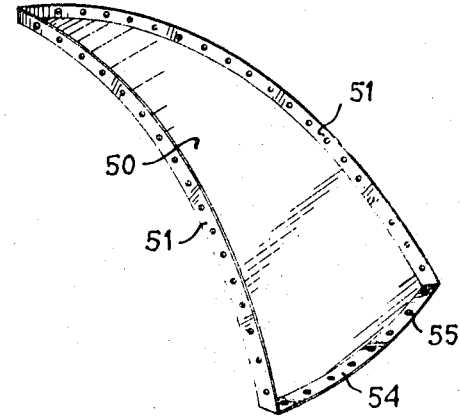

3,562,047
METHOD FOR FORMING CYLINDRICAL TANKS
Dominique Carlini, Rousset, France, assignor to Recherches et Applications des Plastiques dans l'Industrie et le Batiment, S.A., Rousset, France, a French company
Filed Apr. 11, 1968, Ser. No. 720,710
Claims priority, application France, Aug. 16, 1967, 117,983
Int. Cl. B65h 81/03
U.S. Cl. 156—184           5 Claims

ABSTRACT OF THE DISCLOSURE

Cylinderical tanks and a method of and apparatus for forming such tanks from reinforced plastic material, the tanks being comprised of vertically stacked cylindrical sections. Each cylindrical section is formed of two thicknesses of resin impregnated fabric which have been successively wound over a mandrel, the thicknesses being vertically displaced to permit overlapping at the joints between sections. As each section is completed, the mandrel is reduced in diameter and the section is raised vertically.

BACKGROUND OF THE INVENTION

(1) Field of the invention

The present invention relates to the fabrication of tanks for the containment of fluids. More particularly, the present invention is directed to a process for the manufacture of tanks from reinforced plastic, resin or polyester and to apparatus employed in such process. Accordingly, the general object of the present invention are to provide novel and improved methods and apparatus of such character.

(2) Description of the prior art

While not limited thereto in its utility, the present invention is particularly applicable to the manufacture of cylindrical tanks of large capacity which have a diameter and height such that they are practically intransportable, such tanks consequently having to be manufactured on the site where they are to be used.

Prior to the present invention, the manufacture of tanks of reinforced plastic was subjected to certain limitations. While it has been possible to manufacture the traditional metal tanks in any dimension from separate parts which were fabricated in the workshop and assembled on the desired site of the tank, such a technique could not be employed for tanks of reinforced plastic. Tanks of reinforced plastic, when they had to support substantial pressures, previously could not be assembled from separate parts because this would lead to weaknesses at certain points. Accordingly, with regard to such plastic tanks, one had previously to be content with the manufacture of small and medium capacity units.

In general, tanks of reinforced plastic are made by winding, over a cylindrical horizontal mandrel, sheets of glass fiber fabric impregnated with a polyester resin to which has been added a catalyst. The cylinders of plastic material so obtained are then taken off the mandrel and a head placed on each end thereof to complete the unit, the heads being manufactured separately.

It will readily be understood that the above-described process limits the diameter of the tank since it is not possible to provide a very large diameter mandrel. The prior art processes have also imposed a limit on the length of the tanks since, beyond a certain length, the resulting cylinder of plastic material which was to be taken off the mandrel would be unduly large and the mandrel would have to have an excessive span thereby making it liable to bending.

As may be seen from U.S. Pat. No. 2,808,097, to W. G. Martin, equipment is known which is intended for the fabrication of tanks which are non-transportable, such equipment being intended for use on the site where the tank will be built. Such equipment, as exemplified by the Martin patent, comprises a mandrel formed of panels which can be assembled supported by a series of jacks provided on a base, the base having a raceway on its upper portion. Means are also provided for putting the mandrel into rotation so as to wind thereon in spirals a network of glass fiber threads impregnated with polymerizable resin. With such equipment, when a portion of the tank has been finished, it is raised by means of the jacks, a ring formed of the panels of the mandrel is dismantled, and the panels are assembled between the lower ring and the raceway.

The above-described prior art equipment is complicated, requires a large and specialized labor force and, accordingly, tanks manufactured therewith have been very expensive.

SUMMARY OF THE INVENTION

The present invention overcomes the above-discussed disadvantages of the prior art and, in so doing, permits the manufacture in a simple and economical manner, and without the requirement of a specialized labor force, of tanks of plastic material, such tanks having unlimited dimensions both in respect to height and diameter.

The process in accordance with the present invention relates to the manufacture of cylindrical tanks of reinforced plastic material, such tanks being formed by the winding of sheets of fabric or thread on a vertical mandrel. The material comprising the fabric is, prior to winding, impregnated with a resin to which has been added a catalyst. More particularly, the process comprises the winding over the mandrel of plural thicknesses of fabrics impregnated with a polymerizable plastic material, reducing the diameter of the mandrel, sliding vertically upwards over the reduced diameter mandrel the portion of the tank previously manufactured, returning the mandrel to its initial diameter, winding over the mandrel a new thickness of fabric impregnated with polymerizable plastic material and continuing the process until the desired final height of the tank has been reached. The built up thickness of a first fabric impregnated with plastic material is, in accordance with the present invention, displaced in height with relation to a second thickness so that the said thicknesses overlap at the joints of successive thicknesses or sections arranged on top of one another.

In accordance with a further characteristic of the present invention, elements are used which consist of sectors presenting a vertical wing, such wings being intended to fit exactly the outer diameter of the lateral wall of the mandrel, and a horizontal wing constituting a perforated outwardly extending flange. The elements are assembled end-to-end to enclose the mandrel and a first thickness of fabric impregnated with polymerizable plastic is wound along the lower edge of the vertical wing of the elements and over the mandrel. Thereafter, following higher thicknesses of impregnated plastic are wound from the flange of the elements, over the vertical wing of the same and over the first thickness of the impregnated fabric. The width of the fabric of the first thickness is such that it projects from lower edge of the higher thickness thereby permitting the overlapping of the edges of successive, adjacent thicknesses.

To form the upper ends of tanks fabricated in accordance with the present invention, separate top elements of a generally dished isosceles triangular form, the concavity of which is intended to be turned toward the inside of the tank, are employed. The length of these triangular top elements corresponds to the radius of the tank and each element presents, alongside each of its two equal sides, a vertical flange provided with a series of regularly spaced holes. The top elements also each have, along their third sides, a flange provided with holes intended to be bolted to the flange of the aforementioned sectors. The vertical flanges are assembled to the flanges of the identical adjacent top elements by means of bolts passing through the aforementioned regularly spaced holes.

The present invention also relates to equipment to be employed in the process as defined above, this equipment being relatively uncomplicated and thus maintenance free, easy to operate and readily portable so that tanks of any desired capacity can be manufactured at any desired site.

The equipment in accordance with the present invention is of the type comprising a vertical mandrel and is notably characterized in that it comprises means, turning around the mandrel, to wind thicknesses of fabric thereon. The equipment of the present invention also comprises means for impregnating the thicknesses of fabric with polymerizable resin, means for reducing the diameter of the mandrel after polymerization of the fabric and means for sliding vertically upwards the thicknesses of fabric so wound, which thicknesses constitute a portion of the tank to be manufactured.

BRIEF DESCRIPTION OF THE DRAWING

The present invention may be better understood and its numerous advantages will become apparent to those skilled in the art by reference to the accompany drawing wherein like reference numerals refer to like elements in the various figures and which:

FIG. 1 is a perspective view of the apparatus in accordance with a preferred embodiment of the present invention.

FIG. 2 is a perspective view, partially broken away, depicting the fixing and distributing device for plastic material employed in the present invention and in the apparatus of FIG. 1.

FIG. 5 is a partial cross-sectional view of a tank fabricated in accordance with the present invention.

FIG. 6 is a cross-sectional view, taken along a horizontal plane, of a mandrel employed in the practice of the present invention.

FIG. 7 is a schematic view, partly in section, of the mandrel of FIG. 6 and lifting apparatus which forms a portion of and is used in the present invention.

FIG. 8 is a perspective view of an element designed to be placed on the mandrel to allow the fastening of the elements which close the top of tanks fabricated in accordance with the present invention.

FIG. 9 is a perspective view of an element of a tank top in accordance with the present invention.

DESCRIPTION OF THE PREFERRED EMBODIMENT

Figure 3:
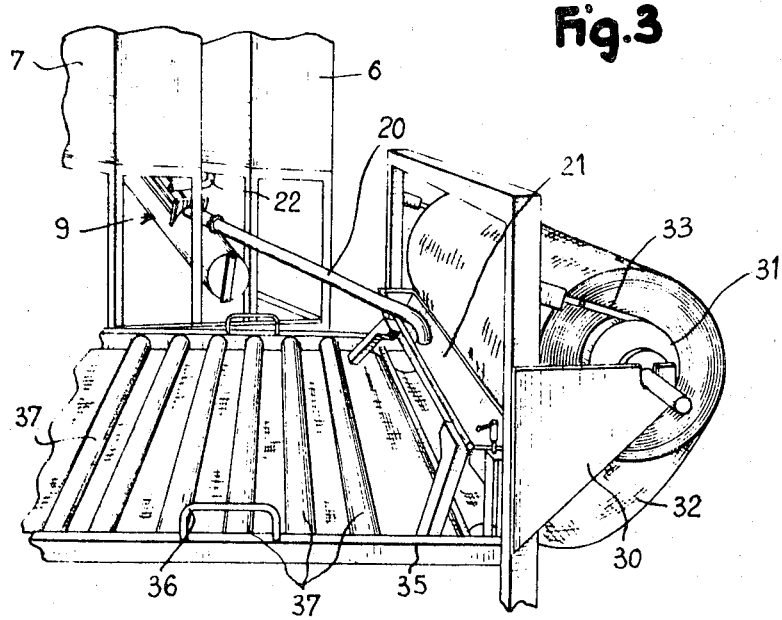
FIGS. 3 and 4 are perspective views of impregnating apparatus employed in the present invention and constituting part of the apparatus of FIG. 1.
Figure 4:
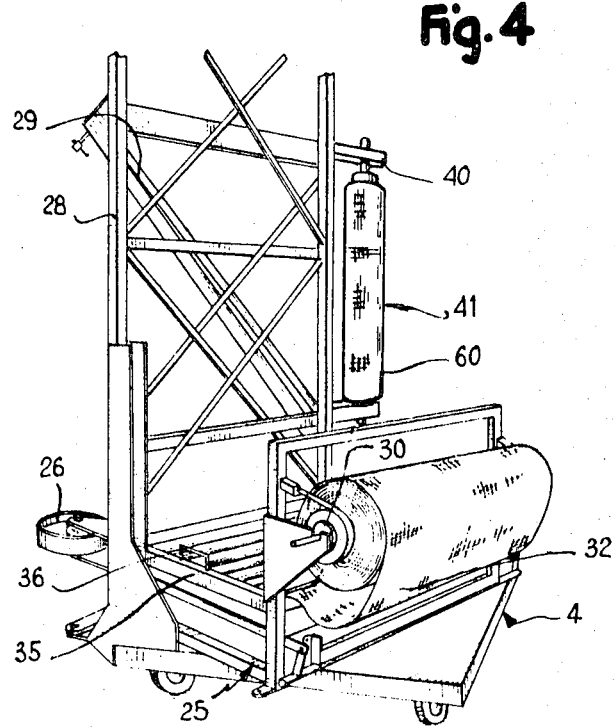

The equipment shown in the various figures comprises a vertical cylindrical mandrel 1, inside which stand three vertical poles 2, each pole being provided with a lifting element 3. The equipment also comprises a truck 4 and a tractor 5 for the said truck. The mandrel 1 may be of any suitable type and is preferably made up of panels which can be dismantled so that they can be readily transported and be erected directly on the site where it is desired to put up the tank.

A portion of vertical cylindrical mandrel 1 is shown in horizontal section in FIG. 6. The mandrel comprises panel 70, 71, 72 and 73, each panel being dished and having vertical flanges. The panel 70 has two oppositely disposed vertical flanges 74 which extend inwardly and which are folded nearly perpendicular to the surface of the panel. The panel 71 presents a flange 75 which is bent nearly at a right angle to the panel, flange 75 being designed to rest against the corresponding flange 74 of panel 70. The panels are assembled by means of bolts 81 passing through aligned holes provided in the flanges. The second flange 76 of panel 71 forms a sharp angle with the inner surface thereof and is designed to cooperate with a flange 77 of an adjacent panel 72. Panel 72 has a second flange 78 which rests against the first flange 79 of the panel 73. As can be clearly seen from FIG. 6, the flanges 77, 78, 76 and 79 are parallel so that the panel 72 can easily be dismantled towards the inside of the mandrel. It is to be understood that adjacent flanges are normally bolted together.

Referring again to FIG. 1, the truck 4 has, mounted on its front portion, vats 6 and 7. Disposed between vats 6 and 7, in a free space 8, is a device 9 for the distribution and mixing of plastic material. The device 9 is shown in greater detail in FIG. 2 and is formed of a trough 10 which slopes toward the rear of the truck 4. The bottom end 11 of trough 10 is in the form of a tube which is closed by a plug 12. Bearings 13, 14 and 15 are disposed in trough 10 and support a revolving shaft 16. One end of shaft 16 is connected to a flexible transmission 17 which is in turn connected to the power coupling of the tractor 5. The other or free end of shaft 16 is provided with stirring paddles 18, the paddles being located inside the tubular portion 11 of trough 10.

Considering now FIGS. 2 and 3 simultaneously, a duct 20 extends from tubular portion 11 of trough 10 and opens into a distribution trough 21 which provides for the distribution of resin. The vat 6 contains, for example, an accelerated resin while the vat 7 contains a catalyzed resin, the mixing of these two components permitting polymerization. A duct 22 extends from the bottom of vat 6 and opens into trough 10 of device 9. A duct 23 extends from the bottom of vat 7 and also opens into trough 10. The ducts 22 and 23 are each provided with a delivery control cock and allow the accelerated resin and the catalyzed resin to flow out of the vats and into trough 10, the resin and catalyst being mixed by stirring paddles 18 in tubular portion 11 of trough 10 so that a perfectly homogeneous mixture flows out through duct 20.

The rear section of truck 4 supports a frame 25 provided with a small wheel 26 designed to cooperate with a runway 27 provided on the exterior of mandrel 1. The frame 25 also comprises a support 30 for the axis of a roller 31 on which is wound a sheet of material, for example a glass fiber based fabric. The support 30 is provided with a brake 33 formed by an elastic band fixed at its ends to the brackets of a support and rubbing against the roller 31.

A container 35, which is mounted in a removable manner and provided with handles 36, extends from the roller 31 to beneath a vertical part 28 of frame 25. Inside the container 35 rests a frame which supports a series of parallel, horizontal rollers 37, the rollers being positioned in a perependicular direction with respect to the movement of sheet 32 as it is drawn off roller 31. The resin and its catalyst are delivered to trough 21 through the duct 20. Trough 21 is provided with a series of regularly spaced holes in its bottom and the resin-catalyst mixture flows through these holes into the container 35 thereby impregnating the sheet 32. The sheet 32 passes beneath the rollers 37, the rollers insuring a uniform impregation and at the same time preventing an accumulation of an excess of resin on sheet 32.

The vertical portion 28 of frame 25 comprises a roller 29 which is inclined in the direction of the front part of the truck 4. The impregnated sheet 32 passes over roller 29 and is applied thereby against the outside lateral wall of the mandrel 1. Vertical frame portion 28 is also provided with a support 40 for a roller 41 which may have stored thereon a sheet of fabric 60 which may, for example, also be composed of glass fiber. Fabric 60 will usually be of a different nature than fabric 32 which is stored on roller 31.

It is to be noted that truck 4 will usually also be provided with a compressor, not shown, and a spray gun for projecting resin for the purpose to be discussed below.

FIG. 5 depicts, in cross-section a part of the mandrel together with the manufactured tank to further illustrate the process in accordance with the present invention. To manufacture a tank, sectors are fabricated preliminarily, preferably of reinforced polymerized resin. Considering one such sector, sector 45 presents a vertical wing 46 designed to fit accurately to the lateral wall of the mandrel 1 and a horizontal wing 47 which defines a flange provided with regularly spaced holes 48. Also preliminarily fabricated are elements, such as element 50, which are designed to form the upper part of the tank. The elements 50 presents two vertical flanges 51 with regularly spaced holes 52 therein and a horizontal flange 54 provided with holes 55 (see FIG. 9), the spacing of holes 55 corresponding to that of the holes 48 in horizontal wing portion 47 of sector 45.

To put the elements 45 in position, two adjacent elements are bridged by an element 50 and bolts are inserted into the aligned holes 45 and 48. Next, the cable 58 of the lifting elements 3 (see FIG. 1) carried by the poles 2 are attached to the free holes 48 in sectors 45. Proceeding in this manner, a crown accurately fitting the surface of mandrel 1 is produced, some of the elements 50 not having been put into place so as to allow the passage of the poles 2.

One or several thicknesse of fabric 60 from the roller 41 are depoited below the vertical wing 46 of sectors 45 and onto the mandrel 1 and resin containing a suitable catalyst is projected onto the fabric 60. The layers fabric 60 are built up until commensurate with the thickness of wing 46. Preferably, the resin-containing catalyst will be projected onto the fabric 60 with the help of the aforementioned spray gun and compressor carried on truck 4.

When a sufficient thickness of the fabric 60 from roller 41 has been deposited on the mandrel 1, the sheet material 32 will be drawn off roll 31 and will be wound over the wing 46 and fabric 60 in such a manner that the top edge of sheet 32 is in contact with the underside of flange 47. This results in any space existing between the bottom edge of wing 46 and the top edge of fabric 60 being situated a substantial distance from the edges of the thickness of fabric 32. It is to be noted that fabric 32 does not extend the complete width of fabric 60 and that there will thus remain an exposed lower ring portion of fabric 60 extending from the lower edge of fabric 32. When the fabric 32 has been deposited to the desired thickness, the portion of the tank which has been thus manufactured is moved vertically upwards and a new layer of fabric 60′ is deposited on the mandrel adjacent the bottom edge of the previously formed layers of fabric 60. Thereafter, overlapping the exposed portions of fabric 60 and 60′, a new thickness of fabric 32′ is formed and the thus formed second portion of the tank is moved vertically upwards. The process is continued in this manner until the desired tank height has been achieved.

As will now be obvious to those skilled in the art, the apparatus in accordance with the present invention is easy to operate and permits the putting up on a desired tank site of large capacity tanks with a height and diameter which would prevent their transport. The actual tank erection procedure employing the above-discussed equipment will now be described.

On the site where the tank is to be erected, a concrete slab or base for the tank will be first formed. The concrete slab will permit the erection of the mandrel 1 and the running of the truck 4 and tractor 5. The concrete slab must, therefore, present a dimension which is greater in diameter than that of the tank which is to be manufactured.

As previously described, the elements 45 and 50 are assembled and raised and the fabric 60 is wound onto the mandrel 1 by moving the truck 4 with tractor 5 and subjecting the fabric 60 to a resin spray. The truck 4 is coupled to the tractor in such a way that the wheel 26 rests permanently against the runway 27. When a suitable thickness of fabric 60 has been wound on the mandrel below the bottom edge of wing 46 of element 45, such thickness corresponding to the thickness of wing 46, the thus wound fabric 60 will be severed from the remainder stored on roller 41. The sheet of fabric 32 will then be drawn off roller 31 and passed into container 35 and beneath the rollers 37. Sheet 32, as guided by the roller 29, is applied to previously wound fabric 60 and over the outside surface of wing 46. As with the application of fabric 60, the sheet 32 is applied by moving truck 4 regularly along the lateral wall of the mandrel 1. Fabric 32 is, of course, impregnated with resin as it passes through container 35. Impregnation occurs through the regular flow of resin and catalyst from vats 6 and 7 through ducts 22 and 23, the catalyst and resin flows being mixed in tubular portion 11 of trough 10 by paddles 18 and the flow of the mixture thereafter passing through the duct 20 into trough 21 and being discharged through the slots in trough 21 over the sheet 32. As previously noted, sheet 32 will be uniformly impregnated with resin due to the action of rollers 37 and the sheet 32 will be wound in superimposed thickness over the wing 46 and the thickness of fabric 60.

When a sufficient thickness of fabric 32 has been deposited, the fabric will be severed and the tractor 5 stopped. Next, panel 72 of mandrel 1 (see FIG. 6) is unbolted so as to allow the reduction of the diameter of the mandrel. As soon as panel 72 has been withdrawn, the portion of the tank previously formed is slid vertically upwards, the tank portion being drawn by cables 58 of lifting elements 3 which are mounted on poles 2, the cables being attached to holes 48 in members 45.

When a first or upper part of the tank has been finished, the same is raised to such a height that a new thickness of fabric 60′ can be deposited along the bottom edge of the thickness of fabric 60 (FIG. 5). Prior to the winding of fabric lyer 60′, panel 72 will be reinserted in the mandrel. The width of the sheets of fabric 32 and 60 is almost the same so that the built up thickness of fabric 32 does not completely overlap the thickness of fabric 60′, fabric 60 being displaced downwards by the height of the wing 46 while the thicknesses of fabric 32 starts directly at the bottom surface of the flange 47. When the new thickness of fabric 60′ is laid, a new thickness of fabric 32′ is wound thereover, the new thickness of fabric 32′ bridging the butting ends of fabric thicknesses 60 and 60′. At the completion of the build up of fabric thickness 32′, the extended tank is raised and the process continued.

When the tank has reached the desired height, the panels constituting the mandrel are dismantled and are withdrawn from the interior of the tank. This may, for example, be accomplished by keeping the tank raised and by passing the panels underneath the bottom edge of the tank. The poles 2 may simply be sunk at their lower ends into cavities 85 provided in the concrete slab and the poles may thus be readily withdrawn through the openings in the top of the tank (see FIG. 7). After the withdrawal of the poles 2, the missing top elements 50 are put into place. At this point, the only tasks remaining are the sealing of the bottom end of the tank and the manufacture of its base. The base is manufactured in the traditional manner by depositing, on the concrete slab, layers of resin impregnated fabric, the edges of these fabric layers fitting exactly the inside lateral wall of the tank. In the usual instance, in order to enable the manufacture of the base, an inspection hole is cut into the lateral wall of the tank, the hole being sealed by a leak-proof door when the tank is completed.

While a preferred embodiment has been shown and described, various modifications and substitutions may be

What is claimed is:
1. A process for the manufacture of tanks of generally cylindrical shape comprising the steps of:
   winding a thickness of fabric impregnated with polymerizable plastic over a vertical mandrel to form a first tank section of cylindrical shape;
   reducing the diameter of the mandrel;
   moving the thus formed first cylindrical section upwards over the mandrel;
   returning the mandrel to its original diameter; and
   winding a thickness of fabric impregnated with polymerizable plastic over the mandrel to form a second tank section extending downwardly from said first tank section.
2. The process of claim 1 wherein the steps of winding fabric over the mandrel comprises:
   forming a series of thicknesses of fabric on the mandrel, first and second of said thicknesses being displaced vertically relative to one another, thicknesses of said first and second cylindrical tank sections overlapping at the joint therebetween.
3. The process of claim 2 further comprising:
   forming an upper rim portion for the tank; and
   mounting said rim portion on the vertical mandrel.
4. The process of claim 3 wherein the step of forming the first tank section comprises:
   winding a first thickness of impregnated fabric over the mandrel and in juxtaposition to the rim portion; and
   winding a second thickness of impregnated plastic over a portion of the rim and the first thickness of fabric.
5. The process of claim 4 further comprising the steps of:
   joining a plurality of triangularly shaped elements to the rim and to one another to form a top for the tank.

References Cited

UNITED STATES PATENTS

| | | | |
|---|---|---|---|
| 2,477,930 | 8/1949 | Hiebert | 264—32 |
| 2,892,239 | 6/1959 | Neff | 264—32 |
| 3,266,637 | 8/1966 | Kaupin et al. | 52—245X |
| 3,304,351 | 2/1967 | Sweeney | 264—32 |
| 3,443,276 | 5/1969 | Smith et al. | 264—32X |

BENJAMIN R. PADGETT, Primary Examiner

G. SOLYST, Assistant Examiner

U.S. Cl. X.R.

156—187, 195